United States Patent [19]

Mendeleev

[11] Patent Number: 5,319,366
[45] Date of Patent: Jun. 7, 1994

[54] AUTOMATIC TRAFFIC CONTROL DEVICE AND METHOD THEREOF

[76] Inventor: Oscar Mendeleev, Merkaz Klita #64, Mevasseret Zion, Jerusalem 90805, Israel

[21] Appl. No.: 934,080

[22] Filed: Aug. 20, 1992

Related U.S. Application Data

[63] Continuation-in-part of Ser. No. 599,774, Oct. 18, 1990, abandoned.

[30] Foreign Application Priority Data

Jul. 17, 1990 [IL] Israel ................................. 095115

[51] Int. Cl.⁵ ............................................. G08G 1/095
[52] U.S. Cl. ..................................... 340/907; 180/170
[58] Field of Search ............... 180/165, 170, 197, 198, 180/199; 185/15, 16; 404/71; 482/54, 900; 340/907, 928; 73/117

[56] References Cited

U.S. PATENT DOCUMENTS

| | | | |
|---|---|---|---|
| 3,690,165 | 9/1972 | Sturmo et al. ...................... | 73/117 |
| 4,415,055 | 11/1983 | Ahn .................................... | 180/198 |
| 4,442,708 | 4/1984 | Gable et al. ........................ | 73/117 |
| 4,455,866 | 6/1984 | Barrigar ............................. | 73/117 |
| 4,473,753 | 9/1984 | Izumi et al. ........................ | 180/165 |
| 4,825,690 | 5/1989 | Mears ................................. | 73/117 |
| 4,953,391 | 9/1990 | Schober ............................. | 73/117 |

FOREIGN PATENT DOCUMENTS

| | | | |
|---|---|---|---|
| 0563605 | 12/1923 | France ............................... | 185/16 |
| 2465900 | 4/1981 | France ............................... | 185/15 |
| 50371 | 1/1981 | Israel . | |

*Primary Examiner*—John K. Peng
*Assistant Examiner*—Tim Johnson
*Attorney, Agent, or Firm*—Panitch Schwarze Jacobs & Nadel

[57] ABSTRACT

An automatic traffic control method and device includes an endless conveyor which is located along a predetermined length of a road for carrying a vehicle travelling in a first direction, the conveyor capable of moving in a second direction opposite to the first direction, thereby reducing the vehicle's virtual speed. A regenerative braking device engages the conveyor to oppose the conveyor movement. The braking device can also be used to reclaim kinetic energy generated by a decelerated vehicle. A sensor senses the vehicle speed and provides a signal to modulate the braking device. A receiver-decoder receives transmitted command signals to modulate the sensor signal, thereby to remotely set a desirable speed limit and ensure the passing vehicles obey the speed limit.

14 Claims, 1 Drawing Sheet

AUTOMATIC TRAFFIC CONTROL DEVICE AND METHOD THEREOF

This is a continuation-in-part of Ser. No. 07/599,774 filed Oct. 18, 1990, now abandoned.

BACKGROUND OF THE INVENTION

Field of the Invention

The present invention relates to an automatic traffic control method and device, and more particularly to a device for controlling traffic at certain high risk road sites, such as busy streets, crossroads, poor visibility highway curves, steep slopes, or checkpoints.

Apart from poor road conditions, another two closely connected factors are known to be responsible for a growing number of traffic accidents. The first factor includes speeding on high risk road sites such as busy streets or crossroads, poor visibility highway curves or steep slopes. The second factor is inadequate traffic control such as poorly lit stop signs and overcrowded intersections, as well as the inability to compel every single vehicle to obey orders or traffic regulations. Many of the prior art methods and devices fail to cope with these problems.

Traffic signs are typically located at known dangerous sites to help maintain safe traffic flow. However, traffic signs are only able to remind or warn a driver of a dangerous condition. The traffic signs alone cannot prevent accidents. Likewise, while traffic lights and police are intended to control the flow of traffic by ordering drivers to slow or stop their vehicles, the number of traffic accidents keep growing.

The problem is that undisciplined or unskilled drivers, as well as those with ill intentions, do not often heed the warnings or obey the orders. To subsequently blame the guilty driver, after the fact, is not a suitable remedy.

Furthermore, under certain circumstances, even a well-intentioned and trained driver may not be in a position to slow or stop a vehicle due, for example, to vehicle brake failure. A driver may miss a poorly visible traffic sign, e.g. under heavy rain, snow, fog conditions, or even fall asleep at the wheel. In these situations, the consequences can be disastrous.

Another prior art method for controlling traffic is based upon putting speed bumps in the road at or near certain high risk sites. These bumps, though able to restrict the vehicle speed, suffer serious disadvantages. The speed bumps do not allow the imposed low speed limit to be lifted or varied irrespective of the time or day of the week, current traffic capacity, or other suitable circumstances. Unlike police, the bumps cannot discriminate between a casual violator and ambulance, police, fire brigade, or VIP's vehicle, which may be authorized to exceed speed limits when necessary. The bumps also cause excessive wear and tear to vehicles, discomfort to the passengers, higher fuel consumption and air pollution, as all bad roads do.

Thus, none of the cited prior art methods and devices is effective and reliable enough to cope with the above-mentioned traffic problems. Nor can they provide for reclaiming kinetic energy wasted by a vehicle having to decelerate in a high risk road site. What is necessary is, therefore, a virtual control method or device to ensure that every vehicle shall obey traffic laws or orders. This means that such a device should effectively operate irrespective of either material factors, e.g. conditions of the vehicle brakes, traffic sign visibility, etc., or human factors, such as the driver's personal skill, conditions or intentions. On the other hand, the device should be flexible enough to enable certain vehicles, such as those typically provided with special siren signals, to exceed the imposed speed limits. The device should be easily adjusted to adapt to changes in the dynamic condition of the road, and provide for reclaiming kinetic energy wasted by a vehicle having to decelerate in a high risk road site.

The present invention is directed to a method and device for controlling traffic in certain high risk or busy road sites. The present invention reclaims kinetic energy wasted by a braking vehicle by providing affirmative speed control tactics.

SUMMARY OF THE INVENTION

Briefly stated, the present invention comprises a method for traffic control. The method comprises the steps of varying a natural force of traffic lane counteraction to a vehicle moving along a portion of the traffic lane by making the portion of the lane movable in a direction opposite to the direction of movement of the vehicle, and providing the counteraction inversely proportional to a current vehicle speed for controlling the vehicle speed. The method further comprises the step of reclaiming kinetic energy conveyed from the vehicle through the movable portion of the traffic lane.

The present invention also comprises an automatic traffic control device. The device includes an endless conveyor means located along a predetermined length of a road for carrying a vehicle travelling in a first direction, the conveyor means being able to move in a second direction opposite to the first direction. Sensing means are provided for sensing a current speed of the travelling vehicle. Braking means are provided which are engaged with the conveyor means and sensing means for braking the conveyor means thereby controlling the vehicle virtual speed and reclaiming wasted kinetic energy of a decelerated vehicle when the speed of the vehicle exceeds a predetermined value. The amount of braking is controlled by the sensing means.

BRIEF DESCRIPTION OF THE DRAWINGS

The foregoing summary, as well as the following detailed description, will be better understood when read in conjunction with the appended drawing. It is understood, however, that this invention is not limited to the precise arrangement and instrumentality shown.

In the drawings.

DESCRIPTION OF THE PREFERRED EMBODIMENT

Figure 1:
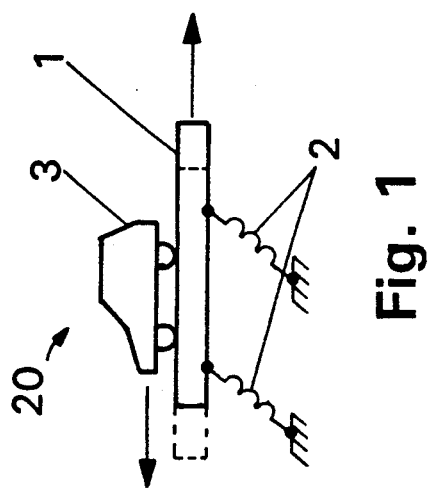
FIG. 1 is a schematic elevational view of a traffic control device in accordance with the present invention.

Referring to the drawing wherein like reference numerals indicate like elements throughout, there is shown in FIG. 1 a block diagram of a traffic control device 20 in accordance with the present invention. A vehicle 3 travels along a portion of a traffic lane in a first direction (toward the left in FIG. 1), said portion being able to move in a second direction opposite to that of the vehicle 3 by force of counteraction to the movement of the vehicle 3. A braking means 2 associated with the movable portion of the traffic lanes obstructs its movement, the amount of braking provided depending on the then current vehicle speed. As a result, the virtual speed of the vehicle 3 is automatically reduced by the value of said portion of the traffic lane velocity.

Figure 2:
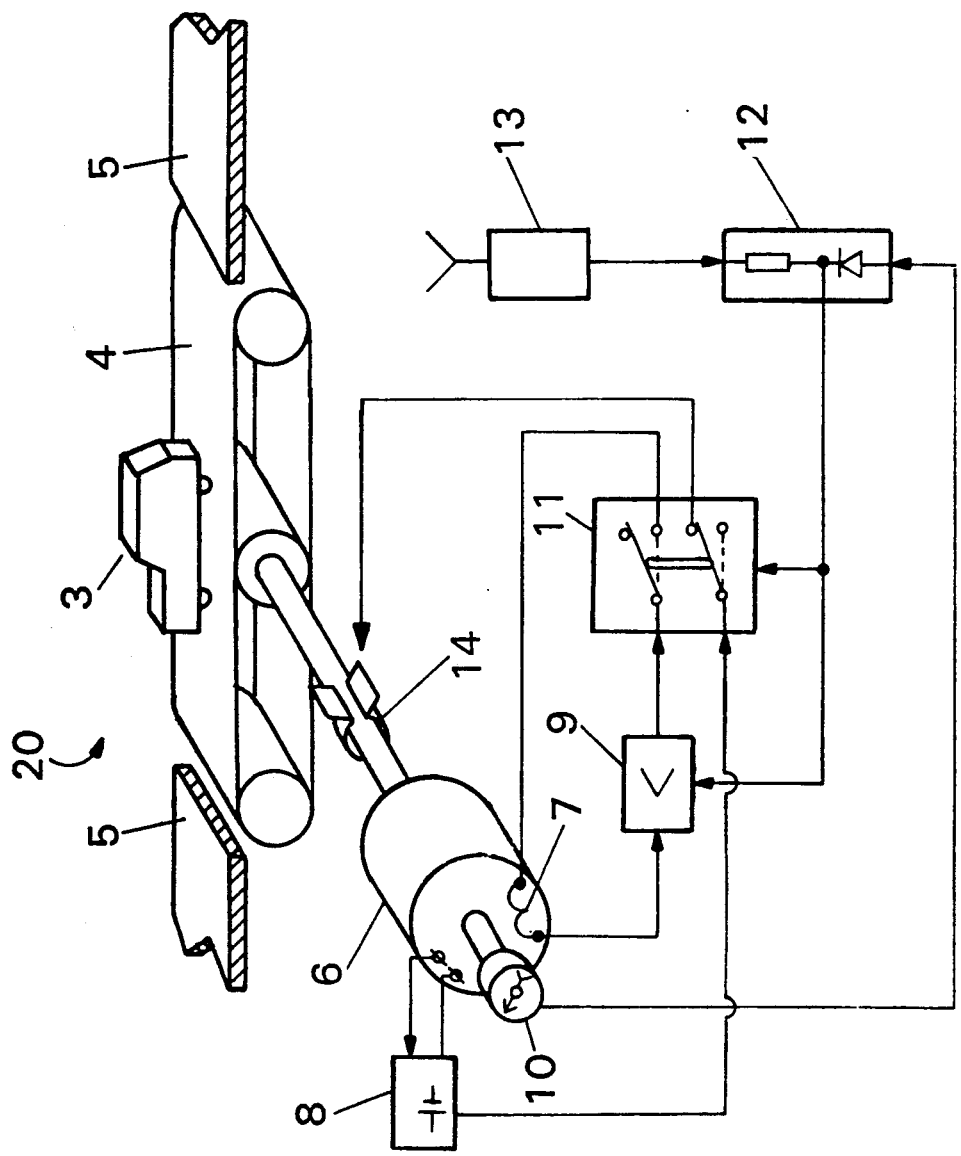
FIG. 2 is a more detailed schematic perspective view of the traffic control device of FIG. 1.

With reference to FIG. 2, there is shown a schematic illustration of a traffic control device of the type shown in FIG. 1. An endless conveyor 4 is located along a portion of a road 5 and can be driven in a direction opposite to that of the vehicle 3 by the vehicle 3 propulsing over the conveyor 4.

An electric generator 6 comprising an exciting coil 7 is engaged with and is driven by the conveyor 4. The output of the generator 6 is connected to a battery 8 for charging the battery 8.

The device also includes a sensing means 10 which senses or measures the current speed of a passing vehicle 3 travelling on the conveyor 4. The sensing means 10 generates an output signal which is (k1 is a coefficient of the proportion) applied through a comparator 12 to an amplifier-inverter 9 which inverts the signal and amplifies the power of the signal.

The output of the amplifier-inverter 9 feeds the exciting coil 7 through closed contacts of a relay 11 to create a magnetic field within the generator 6. The strength of the field created within the generator 6 varies in inverse proportion to variations in the measured speed of the vehicle 3. Therefore, a slow moving vehicle 3 will produce a strong magnetic field within the generator 6, which causes the conveyor 4 to expend greater efforts to drive the generator 6 against the field resistance. Hence, a slow moving vehicle 3 will encounter a hard braked conveyor 4, similar to a regular road surface, which will not significantly affect the vehicle's movement.

When the vehicle speed increases, the field resistance decreases, causing the conveyor 4 to go faster. The vehicle speed causes the conveyor 4 to move in the opposite direction to that of the vehicle 3, and effectively restrains the vehicle speed within given limits. This can be better understood from the ensuing quantitative considerations.

For example, if the speed of the vehicle 3 increases from a certain reference level v1 to v2, which is accompanied by a proportional rise of the sensing means 10 signal from s1 to s2:

$$s2 - s1 = k1 \times (v2 - v1) \quad (1)$$

and, accordingly by the proportional decline of the inversely related magnetic field from f1 to f2:

$$f2 - f1 = k2 \times \frac{1}{s2 - s1} \quad (2)$$

where k2 is another coefficient of the proportion.

Hence, the velocity of the conveyor 4 driven by the vehicle 3 and braked by the magnetic field, will change from c1 to c2:

$$c2 - c1 = k3 \times \frac{v2 - v1}{f2 - f1} \quad (3)$$

where k3 is also a constant coefficient.

Substitution of (1) and (2) into (3) gives an equation:

$$c2 - c1 = k \times (v2 - v1)^2 \quad (4)$$

where coefficient k equals $(k1 \times k3)/k2$.

The equation (4) shows that speed variations of the passing vehicle 3 and those of the conveyor 4 moving in the opposite direction are indeed exponentially related, so that the conveyor 4 will effectively decelerate a potential speed violator.

In addition to smooth, analog control of the conveyor movement the present embodiment of the invention also provides means for compulsory execution of traffic control commands. To this end, the device of the present invention comprises a relay 11, comparator 12, receiver-decoder 13 and conveyor latch 14, as shown in FIG. 2.

The relay 11 is a bistable circuit responding to an input's binary level, either negative or positive (so called "0" and "1"), and not to its actual voltage. A positive input will switch the relay 11 into a state schematically represented by a lower position (dotted lines).

The comparator 12 functions to compare the voltages of the electric signals applied at its two inputs, and produces either a negative or positive output signal, depending on which input signal is greater.

The receiver-decoder 13 receives and decodes radio signals which can be transmitted from a traffic control station, police cars, VIP's escort vehicles, or other authorized personnel. The radio signals contain encoded digital information of a certain threshold voltage to exercise the above-mentioned traffic control commands. A "green light" command is realized by the highest threshold voltage. The "green light" command cancels the current speed limit to provide swift and free passage of a given vehicle, e.g. police, ambulance, fire brigade, VIP's vehicle over the conveyor 4. A "red light" command is realized by a zero threshold and brings passing vehicles on the conveyor 4 to a halt. A "fix" command transmits at an intermediate threshold level, and fixes a desirable current speed limit.

The receiver-decoder 13 applies the detected threshold voltage to the first input of the comparator 12. The second input of the comparator 12 receives electric signals from the sensing means 10. The comparator 12 compares the input signals and produces a positive or negative output depending on whether the speed of a passing vehicle 3 is, respectively, higher or equal, or lower than the limit currently fixed by the above-mentioned threshold voltage.

Responding to the negative output of the comparator 12, which occurs when no speeding vehicle is currently travelling over the conveyor 4, the relay 11 brakes the electric circuit of the exciting coil 7 and energizes the latch 14 to stop the conveyor 4. This turns the conveyor 4 into a regular road surface and saves waste of electric current through the coil 7. When a speeding violator is travelling over the conveyor 4 which results in positive output of the comparator 12, the relay 11 restores the circuit of the exciting coil 7 and deactivates the latch 14 to release the conveyor 4.

The comparator 12 modulates the output signal from the sensing means 10 by a desirable threshold voltage which can be distantly fixed or changed to respond to all sorts of permanent, as well as momentary factors, such as, but not limited to, site and road conditions, current traffic capacity, the weather, time and day of the week, and various social events. This allows the automatic traffic control device to be customized to suit any given situation.

It should be understood that the particulars shown are by way of example and for the purpose of illustrative discussion of the preferred embodiment of the present invention only. It is further to be understood that the particulars presented provide what is believed to be the most useful and readily understood description of the principals and conceptual aspects of the invention. In this regard, no attempt is made to show structural details of the invention in more detail than is necessary for a fundamental understanding of the invention. Furthermore, it is to be understood by those skilled in the art that the physical parameters of the conveyor 4 can be within any suitable range and are not critical to the present invention.

In the preferred embodiment, prefabricated conveyors 4 fixed on metallic frames are used in which the lengths of the conveyors 4 are comparable with that of an average vehicle. A number of such conveyors 4 separated by desirable gaps can be successively fixed along certain traffic lanes to secure sufficient, reliable and compulsory traffic control.

Among the variety of sensing means which can serve as a negative feedback, in the preferred embodiment, a tachometer is fixed in the road and driven by a passing vehicle as is illustrated in FIG. 2. Other prior art devices based on measuring the time difference between the breaking of two parallel emitted beams by the passing vehicle are also suitable, as well as those devices presently used by police to detect speed violators.

In one embodiment of the invention, a plurality of traffic control devices 20 (not shown) may be placed in succession such that the generators 6 of each device 20 are electrically connected. In the case of light traffic, to neutralize the delays caused by an adverse effect of the conveyor inertia, a succeeding conveyor 4 can be started a few seconds prior to a vehicle travelling over it by transmitting an electric current to the succeeding generator 6 from the preceding generator 6. As the vehicle 3 travels over a preceding conveyor 4, the conveyor 4 travels in a second direction opposite to the direction of the vehicle 3 and causes the preceding generator 6 to generate an electric current. The electric current is transmitted to the succeeding generator 6 which causes the succeeding conveyor 4 to travel in the second direction prior to the arrival of the vehicle 3.

Long square electric pulses produced by generator 6 are of constant amplitude, which makes them especially convenient for charging the battery 8 (although potential applications of reclaimed kinetic energy is not limited to electrical battery charging). Indeed, while the conveyor 4 is moving, the output of the generator 6 is directly proportional to both the magnetic field within the generator and to the velocity of the conveyor 4 as the latter drives the generator 6. Hence:

$$\text{generator output} = m \times (\text{conveyor velocity}) \times (\text{magnetic field}) \quad (5)$$

On the other hand, according to the invention, the magnetic field is provided to vary in inverse proportion to the conveyor 4 velocity:

$$\text{magnetic field} = n \times \frac{1}{\text{conveyor velocity}} \quad (6)$$

where m and n stand for constant coefficients of the proportions.

Substitution of (6) into (5) gives $$\text{generator output} = C \quad (7)$$

where constant C equals the product $m \times n$. The expression (7) shows that the output of generator 6 represents square electric pulses of constant amplitude C, the length of each pulse being equal to the period of the magnetic field while the conveyor 4 is continuously moving.

From the foregoing description, it can be seen that the present invention comprises a method and device for traffic control. It will be appreciated by those skilled in the art that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

I claim:

1. An automatic traffic control device comprising:
   an endless conveyor means, located along a predetermined length of a road, for carrying a vehicle, the vehicle travelling in a first direction along the road, and the conveyor means moving in a second direction opposite to the first direction;
   sensing means for sensing a current speed of the vehicle, the sensing means generating an output signal which is proportional to the sensed vehicle speed;
   braking means, engaged with the conveyor means, for braking the conveyor means thereby decelerating the vehicle, the amount of braking being controlled by the sensing means output signal, the vehicle deceleration generating kinetic energy; and
   kinetic energy reclamation means for reclaiming and storing a portion of the kinetic energy generated by the vehicle deceleration and conveyed through the conveyor means.

2. The device as claimed in claim 1 wherein said braking means comprises an electric generator having a rotor coupled to the conveyor means, the electric generator capable of generating a magnetic field, the magnetic field opposing the movement of the rotor, thereby inhibiting movement of the conveyor means coupled thereto.

3. The device as claimed in claim 2 wherein variations of the magnetic field within the generator are provided synchronous with, and inversely related to variations of the output signal of the sensing means.

4. The device as claimed in claim 1 further comprising receiver-decoder means for receiving encoded command signals to modulate the sensing means output signal, the command signals establishing a speed limit, the speed limit being enforced by said device.

5. A device as claimed in claim 4 wherein a plurality of devices can be placed in succession along a predetermined length of the road to facilitate compulsory traffic control.

6. The device as claimed in claim 5 wherein the conveyor means is set into motion by the electric generator functioning as a motor prior to the vehicle arrival.

7. The device as claimed in claim 4 wherein the encoded command signals are transmitted by radio, thereby to remotely set a speed of the conveyor means consistent with a desirable speed limit and ensure passing vehicles obey the speed limit.

8. A device as claimed in claim 1 wherein a plurality of said devices can be placed in succession along a predetermined length of the road to facilitate compulsory traffic control.

9. The device as claimed in claim 8 wherein the conveyor means is set into motion by the electric generator functioning as a motor prior to the vehicle arrival.

10. The device as claimed in claim 6 wherein the generator is fed by an electric current from a preceding generator.

11. The device as claimed in claim 9 wherein the generator is fed by electric current from an output of a preceding generator.

12. The device as claimed in claim 4 wherein the sensing means output signal is modulated by a predetermined value to establish a desirable speed limit to be maintained by the device.

13. The device as claimed in claim 4 wherein the encoded command signals are transmitted by radio thereby to remotely set a desirable speed limit to be enforced by said device.

14. A method for traffic control comprising:
varying natural counteraction of a portion of a traffic lane to a vehicle propelled along the portion of the traffic lane by making the portion of the lane movable in a direction opposite to the direction of the movement of the vehicle;
providing the counteraction inversely proportional to a current speed of the vehicle for controlling the vehicle virtual speed; and
reclaiming kinetic energy conveyed from said vehicle through said movable portion of the traffic lane.

* * * * *

UNITED STATES PATENT AND TRADEMARK OFFICE
CERTIFICATE OF CORRECTION

PATENT NO. : 5,319,366
DATED : June 7, 1994
INVENTOR(S) : Oscar Mendeleev

It is certified that error appears in the above-indentified patent and that said Letters Patent is hereby corrected as shown below:

In Col. 3, lines 18-19, delete "(k1 is a coefficient of the proportion)"; line 45, after "s2", insert --(k1 is a coefficient of the proportion)--.

In Column 6, lines 4 through 6, delete "period of the magnetic field while the conveyor is continuously moving" and insert therefor --respective time interval of the magnetic field due to the continuous movement of conveyor 4--.

Signed and Sealed this

Twenty-sixth Day of December, 1995

Attest:

BRUCE LEHMAN

*Attesting Officer*  *Commissioner of Patents and Trademarks*